Nov. 13, 1956  A. DEL NOCE  2,770,486
RAIN GUTTER FOR AUTOMOBILE VENTILATORS
Filed July 15, 1953
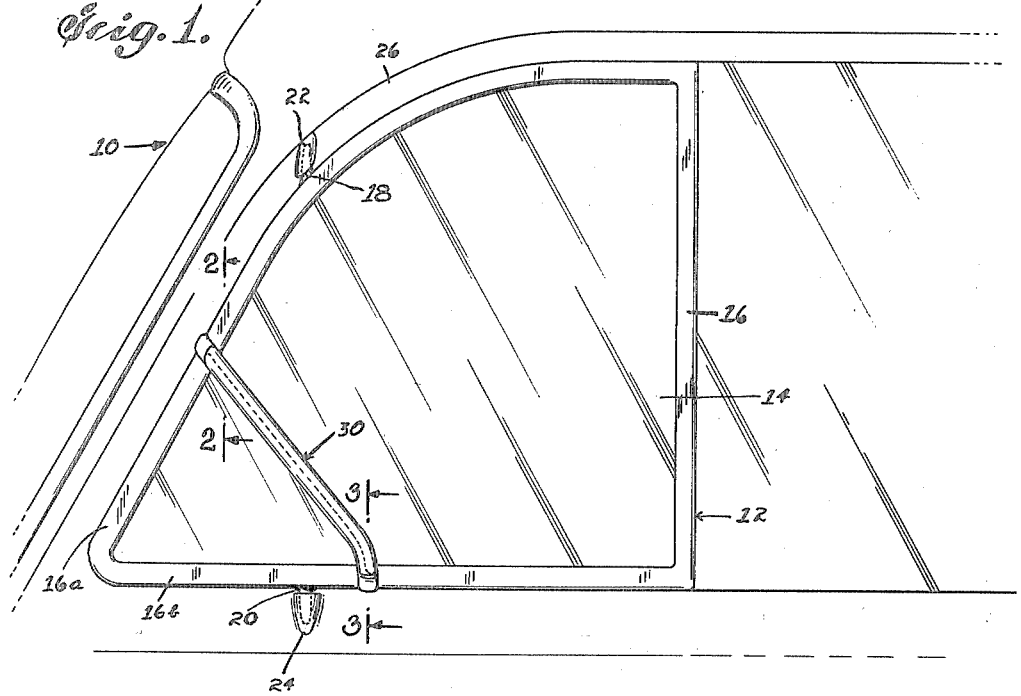
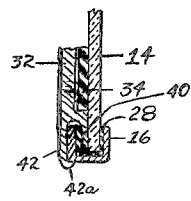
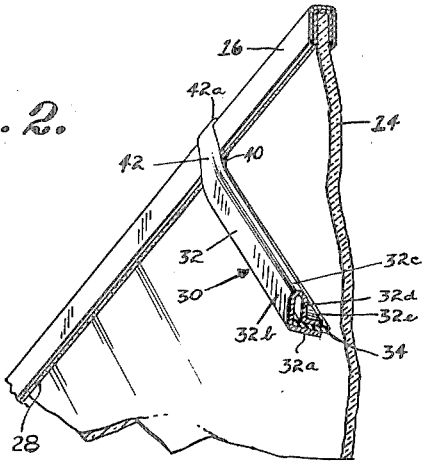
INVENTOR.
ALDO DEL NOCE
BY
ATTORNEY United States Patent Office 2,770,486
Patented Nov. 13, 1956

2,770,486
RAIN GUTTER FOR AUTOMOBILE VENTILATORS

Aldo Del Noce, Brooklyn, N. Y.

Application July 15, 1953, Serial No. 368,155

1 Claim. (Cl. 296—44)

This invention relates to a rain gutter for automobile ventilators.

Automobile ventilators are mounted on vertical pivots and when they are swung to open position they extend partly into the automobile and partly outside of it. It is well known that open ventilators carry rain water into the automobile by virtue of this very fact that a part of the ventilator projects outwardly into the rain and a part projects inwardly into the automobile. The rain runs down the ventilator and while most of it drips harmlessly to the ground, a substantial quantity flows or trickles into the automobile.

It is the principal object of this invention to provide a rain gutter for automobile ventilators which will carry the rain water off the ventilators and to the ground. This rain gutter extends diagonally on the ventilator sloping downwardly and outwardly, that is, downwardly toward the ground and outwardly away from the automobile when the ventilator is in open position. The rain water which would normally tend to run or trickle into the automobile is thereby directed away from the automobile and to the ground.

An important feature of this invention is the fact that the rain gutter herein claimed is in the nature of an accessory which may be installed by the average automobile owner. It is not original built-in equipment although it may be if the manufacturers of motor vehicles so desire. Principally, it is intended for installation not by the manufacturer of the automobile but by the owner and it is intended to be universally adaptable to virtually all makes and models of automobiles on the road today.

The rain gutter herein claimed is provided with relatively thin end pieces which may be inserted under the molding or frame which holds the glass pane of the ventilator. A rubber gasket is generally provided between the glass pane and the metal molding or frame and this rubber gasket is sufficiently yielding so that the thin end pieces of the rain gutter may be slipped under said gasket without distorting either the gasket or the frame and certainly without damaging the glass. The two end pieces are set at an angle relative to each other so that once they are inserted under the molding or frame of the ventilator they will securely anchor the rain gutter in place. These thin end pieces may, however, be slipped out of the molding or frame when it is desired to remove the rain gutter from the ventilator. There are no screws or bolts or other fastening members of like nature which would permanently disfigure the molding or frame of thhe ventilator.

A preferred form of this invention is shown in the accompanying drawing in which:

Fig. 1 is a side view of an automobile ventilator showing the rain gutter herein claimed installed thereon.

Fig. 2 is a fragmentary perspective view showing the details of construction of the rain gutter and constituting a section on the line 2—2 of Fig. 1.

Fig. 3 is a fragmentary section on the line 3—3 of Fig. 1.

Automobile 10 shown in Fig. 1 of the drawing is intended to illustrate automobiles generally and particularly those which are provided with side ventilators. Ventilator 12 is intended to be purely illustrative of ventilators generally and its specific shape and proportions should not be construed as limiting the invention in any way whatsoever. More specifically, ventilator 12 is generally triangular in shape and it consists of a windowpane 14 encased in a metal frame or molding 16. The metal frame or molding is mounted on a pair of pivots 18 and 20 respectively which are supported by bearings 22 and 24 respectively secured to the frame of automobile door 26. Pivots 18 and 20 are aligned with each other on a substantially vertical axis. Consequently, ventilator 12 may be moved pivotally about said vertical axis to either closed position as shown in Fig. 1 or to open position. In open position the portion of the ventilator which is disposed to the left of pivots 18 and 20, as viewed in Fig. 1, projects inwardly into the automobile and the portion which is disposed to the right of said pivots projects outwardly from the automobile.

Frame 16 of ventilator 12 is a channel-shaped member as Figs. 2 and 3 clearly show. A channel-shaped gasket 28 is provided in said channel-shaped frame and the glass pane 14 is set into said gasket. The frame is, of course, made of metal and the gasket is made of a resilient material such as rubber. This is conventional construction.

Rain gutter 30 consists, basically, of two elements or component parts, one being a frame member 32 and the other being a gasket 34. The frame member may be made of metal or any other suitable material and gasket 34 may be made of rubber or any other suitable resilient material. Frame member 32 comprises a generally tubular bar which may be formed or stamped out of sheet or strip metal. In cross-section through its center portion, frame 32 will be seen to consist of a bottom wall 32a, a side wall 32b projecting upwardly from the bottom wall, a bight 32c along the top of said side wall, a second inner side wall 32d projecting downwardly from said bight and a top wall 32e which is formed in parallel relation to the bottom wall 32a a spaced distance above said bottom wall. A channel is accordingly formed between said top and bottom walls 32e and 32a respectively to accommodate gasket 34 which may simply be a rubber strip substantially rectangular in cross-section.

It will be noted that the end portions of frame 32 are formed to engage frame 16 of the ventilator. More specifically, each end portion of frame 32 is provided with a relatively thin end piece 40 and a finger 42 which is disposed in parallel spaced relation to said thin end piece 40. The thin end piece 40 is sufficiently thin to be slipped under gasket 28 and between said gasket and the glass pane without substantially distorting the rubber gasket or in anywise damaging the glass. Finger 42 projects over the molding or frame 16 of the ventilator and it may be bent at its very end to form a bent portion 42a which extends behind the peripheral edge of said frame or molding 16. Between finger 42 and relatively thin end piece 40, a tight grip upon the frame or molding 16 is provided to prevent accidental displacement of the rain gutter herein claimed relative to the ventilator.

It will be noted that the upper end piece of frame 32 is axially aligned with said frame 32 but that the lower end piece is set at an angle relative to said frame 32. Bearing in mind that the front portion 16a of frame or molding 16 is disposed at an angle to the bottom portion 16b thereof and that said bottom portion 16b occupies a substantially horizontal plane, it will be understood that the upper end of rain gutter 30 may be fastened to the front portion 16a of the ventilator frame at substantially right angles thereto in order to position said rain gutter at an angle of approximately 45° to the horizontal, that is, at an angle of approximately 45° to the bottom section 16b of ventilator frame 16. But since the lower end of the rain gutter is bent at an angle to the main body of said rain gutter, as Fig. 1 clearly shows, the angle being approximately 45°, it will be seen that said lower end of the rain gutter may be affixed to the bottom section 16b of the ventilator frame at approximately right angles thereto. Consequently, both ends of the rain gutter are secured at an angle of approximately 90° to the two sections of the ventilator frame which they engage. While this relationship may vary, it has been found that it provides a very satisfactory support for the rain gutter herein claimed.

It will be noted that when the rain gutter is supported on the ventilator in the manner described, its gasket 34 engages the window-pane 14 at right angles thereto to provide a water-tight seal between the rain gutter frame 32 and said windowpane. The space between the windowpane and wall 32d of frame 32 above the gasket 34 and wall 32e constitutes the rain gutter to carry the rain away from the inside of the automobile and in the direction of the outside of said automobile. At high speeds, when the rain tends to flow upwardly on the ventilator, wall 32a of the rain gutter and gasket 34 thereof will tend to catch the rain and prevent it from flowing upwardly and around the ventilator into the automobile.

The foregoing is illustrative of a preferred form of this invention and it will be understood that this preferred form may be modified and other forms may be provided within the broad spirit of the invention and the broad scope of the claim.

I claim:

A rain gutter for a swingable ventilating window of an automobile, said window having a pane of glass mounted in a metal frame with yieldable gaskets between said pane of glass and said frame, said frame having a generally horizontal lower portion and a front portion which extends upwardly therefrom, said rain gutter comprising a channel-shaped member which is L-shaped in cross-section, one end of said rain gutter being provided with a clip-shaped portion which is adapted to be clipped to the front portion of said frame, said rain gutter being so oriented relative to said clip-shaped portion that it extends diagonally downwardly toward the lower portion of said frame when said clip-shaped portion is clipped to the front portion of said frame, the opposite end of said rain gutter being bent downwardly at an angle to the main body of said rain gutter and being provided with a pointed portion which is adapted to be inserted into said lower frame portion between its yieldable gasket and the pane of glass, and a resilient insert mounted within said rain gutter between its clip-shaped portion and its bent opposite end for engagement with said pane of glass to provide a water-tight seal between said pane of glass and said rain gutter.

References Cited in the file of this patent
UNITED STATES PATENTS

| | | |
|---|---|---|
| 2,196,478 | Simpson | Apr. 9, 1940 |
| 2,263,860 | Schnell | Nov. 25, 1941 |
| 2,500,991 | Kent | Mar. 21, 1950 |
| 2,615,752 | Hoag | Oct. 28, 1952 |